United States Patent
Fukushima et al.

(10) Patent No.: US 10,706,884 B2
(45) Date of Patent: Jul. 7, 2020

(54) MAGNETIC RECORDING MEDIUM AND MAGNETIC STORAGE APPARATUS

(71) Applicant: SHOWA DENKO K.K., Tokyo (JP)

(72) Inventors: Takayuki Fukushima, Chiba (JP); Haruhisa Ohashi, Chiba (JP); Lei Zhang, Chiba (JP); Yuji Murakami, Chiba (JP); Hisato Shibata, Chiba (JP); Takehiro Yamaguchi, Chiba (JP); Tetsuya Kanbe, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 260 days.

(21) Appl. No.: 15/850,226

(22) Filed: Dec. 21, 2017

(65) Prior Publication Data

US 2018/0204591 A1 Jul. 19, 2018

(30) Foreign Application Priority Data

Jan. 13, 2017 (JP) .................................. 2017-004493

(51) Int. Cl.
*G11B 5/73* (2006.01)
*G11B 5/65* (2006.01)
*C22C 19/07* (2006.01)
*C22C 27/06* (2006.01)

(52) U.S. Cl.
CPC .............. *G11B 5/737* (2019.05); *G11B 5/653* (2013.01); *C22C 19/07* (2013.01); *C22C 27/06* (2013.01); *C22C 2202/02* (2013.01)

(58) Field of Classification Search
None
See application file for complete search history.

(56) References Cited

U.S. PATENT DOCUMENTS

| | | | |
|---|---|---|---|
| 6,068,739 A | 5/2000 | Suzuki et al. | |
| 7,521,137 B2 | 4/2009 | Hohlfeld et al. | |
| 8,792,313 B2* | 7/2014 | Niwa | G11B 13/08 369/13.13 |
| 9,159,351 B2 | 10/2015 | Sakamoto et al. | |
| 9,177,585 B1* | 11/2015 | Seki | G11B 5/7379 |
| 9,251,834 B2 | 2/2016 | Zhang et al. | |
| 9,384,772 B2* | 7/2016 | Zhang | G11B 5/65 |
| 10,127,939 B2* | 11/2018 | Niwa | G11B 5/7325 |

(Continued)

FOREIGN PATENT DOCUMENTS

| | | |
|---|---|---|
| JP | H11-353648 | 12/1999 |
| JP | 2006-196151 | 7/2006 |

(Continued)

*Primary Examiner* — Kevin M Bernatz
(74) *Attorney, Agent, or Firm* — IPUSA, PLLC

(57) ABSTRACT

A magnetic recording medium includes: a substrate; a first underlayer; a second underlayer; and a magnetic layer including an alloy having a $L1_0$ type crystal structure with a (001) orientation. The substrate, the first underlayer the second underlayer, and the magnetic layer are stacked in this order. The first underlayer is a crystalline layer that includes W as a main component. The second underlayer is a crystalline layer that includes a material containing W as a main component and that includes an oxide. The content of the oxide in the second underlayer is in a range of from 2 mol % to 30 mol %. The oxide is an oxide of one or more kinds of elements selected from a group consisting of Cr, Mo, Nb, Ta, V, and W.

5 Claims, 2 Drawing Sheets

(56) References Cited

U.S. PATENT DOCUMENTS

| | | | | |
|---|---|---|---|---|
| 2012/0113768 A1* | 5/2012 | Kanbe | .................. | G11B 5/6088 |
| | | | | 369/13.24 |
| 2014/0064047 A1 | 3/2014 | Niwa et al. | | |
| 2014/0308542 A1* | 10/2014 | Zhang | .................. | G11B 5/7325 |
| | | | | 428/831.2 |
| 2014/0376127 A1* | 12/2014 | Kanbe | ...................... | G11B 5/73 |
| | | | | 360/110 |
| 2015/0036242 A1 | 2/2015 | Zhang et al. | | |
| 2015/0117166 A1* | 4/2015 | Zhang | ...................... | G11B 5/65 |
| | | | | 369/13.5 |

FOREIGN PATENT DOCUMENTS

| | | |
|---|---|---|
| JP | 2009-245484 | 10/2009 |
| JP | 2014-220029 | 11/2014 |
| JP | 2015-032326 | 2/2015 |
| JP | 2015-088197 | 5/2015 |

* cited by examiner

MAGNETIC RECORDING MEDIUM AND MAGNETIC STORAGE APPARATUS

CROSS-REFERENCE TO RELATED APPLICATIONS

The present application claims the benefit of priority under 35 U.S.C. § 119 of Japanese Patent Application No. 2017-004493 filed on Jan. 13, 2017, the contents of which are incorporated herein by reference in their entirety.

BACKGROUND OF THE INVENTION

1. Field of the Invention

The disclosures herein generally relate to a magnetic recording medium and a magnetic storage apparatus.

2. Description of the Related Art

In recent years, demand for increasing the storage capacity of hard disk drives has been growing.

However, with existing recording methods, it is difficult to increase the recording density of hard disk drives.

A heat-assisted magnetic recording method is a technique that has been actively studied and attracted attention as a next generation recording method. The heat-assisted magnetic recording method is a recording method in which a magnetic head irradiates a magnetic recording medium with near-field light to partially heat the surface of the magnetic recording medium, such that the coercivity of the magnetic recording medium can be reduced and thereby the magnetic recording medium can be written.

In a heat-assisted magnetic recording method, as a material that constitutes a magnetic layer, a material having a high Ku is used, such as FePt having an $L1_0$ type crystal structure (Ku $7\times10^7$ erg/cm$^3$), or CoPt having an $L1_0$ type crystal structure (Ku $5\times10^7$ erg/cm$^3$).

When a high Ku material is used as the material of a magnetic layer, KuV/kT increases. Here, Ku is a magnetic anisotropy constant of magnetic particles, V is a volume of magnetic particles, k is the Boltzmann constant, and T is temperature. Accordingly, the volume of the magnetic particles can be reduced without increasing thermal fluctuation. In the heat-assisted magnetic recording method, by miniaturizing magnetic particles, transition width can be narrowed. As a result, noise can be reduced and the signal-to-noise ratio (SNR) can be improved.

Also, in order to obtain a heat-assisted magnetic recording medium having high perpendicular magnetic anisotropy, an alloy having an $L1_0$ type crystal structure, which is used as a material constituting the magnetic layer, is required to have a (001) orientation. Here, because the (001) orientation of the magnetic layer is controlled by an underlayer, an appropriate material of the underlayer must be selected.

As a material of the underlayer of the heat-assisted magnetic recording medium, MgO, CrN, TiN, and the like are conventionally known.

For example, Patent Document 1 describes a method for producing an information recording medium in which an underlayer containing MgO as its main component is made, and further an $L1_0$ type ordered alloy layer made of an FePt alloy is made.

Also, Patent Document 2 describes a magnetic recording medium that includes a crystalline underlayer containing W as its main component and containing B, Si, C, or an oxide and includes a magnetic layer containing an alloy having an $L1_0$ structure as its main component.

Also, Patent Document 3 describes, as a temperature control layer of a heat-assisted magnetic recording medium, a thin film that includes a continuous matrix having an area of a material that has a low thermal conductivity and extends to penetrate a film thickness and an area of a material that has a high thermal conductivity that separates the area of the material that has the low thermal conductivity.

RELATED-ART DOCUMENTS

Patent Documents

[Patent Document 1] Japanese Laid-Open Patent Publication No. H11-353648
[Patent Document 2] Japanese Laid-Open Patent Publication No. 2014-220029
[Patent Document 3] Japanese Laid-Open Patent Publication No. 2006-196151

In a heat-assisted magnetic recording medium, in order to obtain favorable magnetic recording characteristics, it is necessary to use a specific underlayer such that a magnetic layer including an alloy having the $L1_0$ type crystal structure has a (001) orientation, as described above.

However, in conventional techniques, an (001) orientation of a magnetic layer is insufficient. Therefore, an underlayer that is able to enhance the (001) orientation of a magnetic layer of a heat-assisted magnetic recording medium is needed.

Further, the underlayer of the heat-assisted magnetic recording medium is required to have a function as a temperature control layer. That is, when a heat-assisted magnetic recording medium is irradiated with near-filed light to locally heat the surface of the heat-assisted magnetic recording medium, the expansion of the heat spot needs to be suppressed such that a magnetic transition area is narrowed in a planar direction and noise is reduced. That is, it is required to increase the signal-to-noise ratio (SNR).

SUMMARY OF THE INVENTION

It is an object of one aspect of the invention to provide a magnetic recording medium having a high signal-to-noise ratio (SNR).

According to one aspect of an embodiment, a magnetic recording medium includes: a substrate; a first underlayer; a second underlayer; and a magnetic layer including an alloy having a $L1_0$ type crystal structure with a (001) orientation. The substrate, the first underlayer, the second underlayer, and the magnetic layer are stacked in this order. The first underlayer is a crystalline layer that includes W as a main component. The second underlayer is a crystalline layer that includes a material containing W as a main component and that includes an oxide. A content of the oxide in the second underlayer is in a range of from 2 mol % to 30 mol %. The oxide is an oxide of one or more kinds of elements selected from a group consisting of Cr, Mo, Nb, Ta, V, and W.

In the magnetic recording medium, the oxide may be an oxide of W.

In the magnetic recording medium, the second underlayer has a non-granular structure.

The magnetic recording medium may further include a barrier layer between the second underlayer and the magnetic layer, wherein the barrier layer includes one or more compounds selected from a group consisting of MgO, TiO, NiO, TiN, TaN, HfN, NbN, ZrC, HfC, TaC, NbC, and TiC, and has a NaCl type structure.

The magnetic recording medium may further include an orientation control layer between the substrate and the first underlayer, wherein the orientation control layer is a Cr layer having a BCC structure, an alloy layer containing Cr as a main component and having a BCC structure, or an alloy layer having a B2 structure.

According to one aspect of an embodiment, a magnetic storage apparatus may include the magnetic recording medium.

Other objects and further features of the present invention will be apparent from the following detailed description when read in conjunction with the accompanying drawings.

DESCRIPTION OF THE PREFERRED EMBODIMENTS

In the following, an embodiment of the present invention will be described with reference to the accompanying drawings. The present invention is not limited to the embodiment as will be described below, and various variations and modifications may be made without departing from the scope of the present invention.

(Magnetic Recording Medium)

Figure 1:
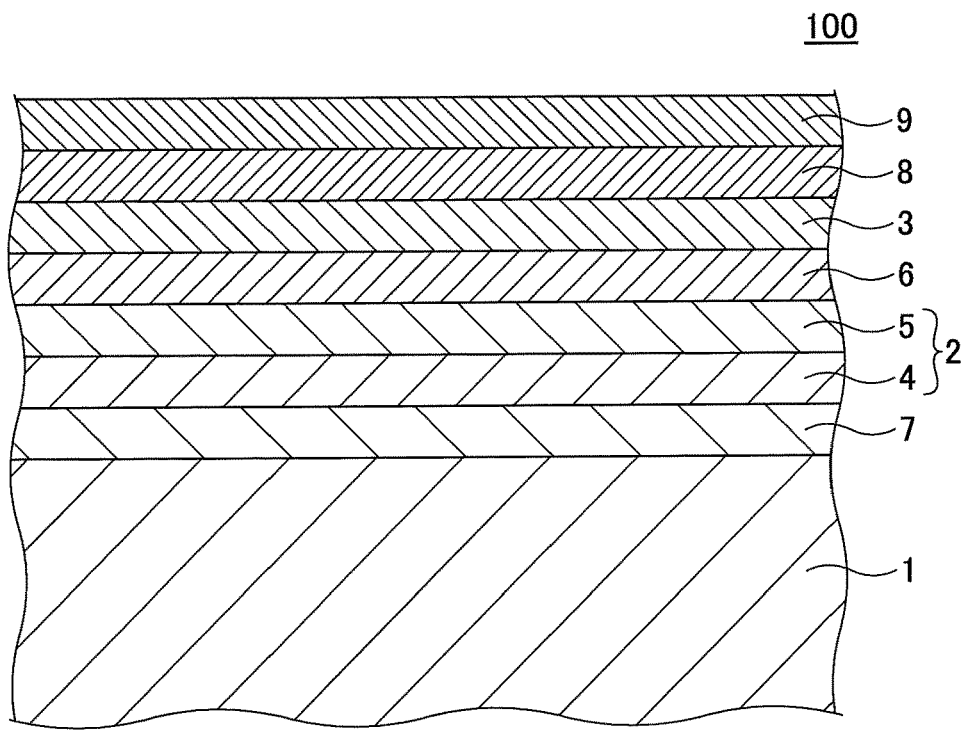
FIG. 1 is a schematic diagram illustrating an example of a magnetic recording medium according to an embodiment.

FIG. 1 illustrates an example of a magnetic recording medium 100 according to an embodiment.

The magnetic recording medium 100 includes, in this order, a substrate 1, an underlayer 2, and a magnetic layer 3 including an alloy having a $L1_0$ type crystal structure with a (001) orientation. The underlayer 2 includes a first underlayer 4 and a second underlayer 5 in this order from the substrate 1 side. The first underlayer 4 is a crystalline layer that includes W as a main component. The second underlayer 5 is a crystalline layer that includes a material containing W as a main component and the second underlayer 5 includes an oxide. A content of the oxide in the second underlayer 5 is in a range of from 2 mol % to 30 mol %. The oxide is an oxide of one or more kinds of elements selected from a group consisting of Cr, Mo, Nb, Ta, V, and W.

By adopting such a configuration, the SNR of the magnetic recording medium 100 can be increased.

The reason why the SNR of the magnetic recording medium 100 becomes high will be described below.

Herein, W included in the underlayer 2 has a body-centered cubic (BCC) lattice structure and thus has a high (100) orientation. This allows the (001) orientation of the alloy constituting the magnetic layer 3 and having the $L1_0$ type crystal structure to be enhanced. Also, the oxide included in the second underlayer 5 can enhance a lattice match between the second underlayer 5 and the magnetic layer 3 without degrading the crystallinity and the (100) orientation of W. Further, when the surface of the magnetic recording medium 100 is locally heated to decrease the coercivity of the magnetic layer 3 for writing, the underlayer 2 can suppress the expansion of the heat spot to narrow a magnetic transition area in a planar direction.

The magnetic recording medium 100 will be described in more detail.

In the magnetic recording medium 100, the underlayer 2 has a two-layer structure, and the first underlayer 4 and the second underlayer 5 are provided in this order from the substrate 1 side. As described above, because the second underlayer 5 is a crystalline layer that includes a material containing W as its main component and has a high (100) orientation, the second underlayer 5 lattice-matches the magnetic layer 3, which is formed above the second underlayer 5 and in which an alloy having a $L1_0$ type crystal structure is (001) oriented. Further, the crystallinity and the (100) orientation of the second underlayer 5 can be further enhanced by providing the first underlayer 4, which is a crystalline layer containing W as its main component, below the second underlayer 5.

For a heat-assisted magnetic recording medium, it is necessary to suppress the expansion of a heat spot such that a magnetic transition area is narrowed in a planar direction in order to reduce noise. Thus, for example, as described in Patent Document 3, when an underlayer is constituted with a granular structure that has a columnar area of a material that is perpendicular to the surface of a substrate and having a high thermal conductivity (such as a metal, for example) and an area of a material having a low thermal conductivity that separates the area of the material having the high thermal conductivity (such as an oxide, for example), heat remains at an interface portion of the columnar area, and therefore it is possible to suppress the expansion of a heat spot in a horizontal direction.

With respect to the above, the second underlayer 5 is not required to have a structure in which a large columnar area of a material having a high thermal conductivity is separated by a thick area of a material having a low thermal conductivity, such as a granular structure. It is preferable that the second underlayer 5 has a non-granular structure in which columnar crystal grains are partially coupled with each other via a thin oxide grain boundary.

When such a non-granular structure includes an oxide of the same volume, relative to a conventional granular structure, the pitch of the oxide grain boundary is fine by a thinner oxide layer at which heat remains and a configuration including many boundary portions of columnar crystal grains and an oxide per unit length is obtained, and therefore, the effect of suppressing the expansion of a heat spot is increased. When such a configuration is adopted, because the specific surface area of columnar crystal grains is increased, an effect of partially reducing an oxide at the time of film formation becomes more noticeable than that of a general granular structure. However, because a metal element constituting an oxide included in the second underlayer 5 is solid-soluble at all proportion in crystal grains of a material containing W as its main component, it is possible to prevent the crystallinity of the crystal grains from being decreased.

In the present specification and the claims, the crystalline layer containing W as its main component refers to a crystalline layer in which the content of W is greater than or equal to 50 at. %. In the crystalline layer containing W as its main component, the content of W is preferably greater than or equal to 80 at. % and is more preferably 100 at. %.

Examples of the crystalline layer containing W as its main component include, but are not limited to, a W layer, a WMo layer, a WCu layer, a WNi layer, a WFe layer, a WRe layer and a WC layer.

In the specification and the claims, the material containing W as its main component refers to a material in which the content of W is greater than or equal to 50 at. %. Here, in the material containing W as its main component, the content of W is preferably greater than or equal to 70 at. % and is more preferably greater than or equal to 90 at. %.

Examples of the material containing W as its main component included in the second underlayer 5 include, but are not limited to, W, WMo, WCu, WNi, WFe, WRe, and WC.

The second underlayer 5 is a crystalline layer that includes an oxide, and a content of the oxide in the second underlayer 5 is in a range of from 2 mol % to 30 mol %.

The oxide is an oxide of one or more kinds of elements selected from a group consisting of Cr, Mo, Nb, Ta, V, and W.

Examples of the oxide include, but are not limited to, $CrO$, $Cr_2O_3$, $CrO_3$, $MoO_2$, $MoO_3$, $Nb_2O_5$, $Ta_2O_5$, $V_2O_3$, $VO_2$, $NO_2$, and $WO_3$. In particular, an oxide of W is most preferable. This is because W, which is generated by partial reduction of an oxide of W, can be especially easily solid-solved at all proportion in crystal grains of a material, which constitutes the second underlayer 5, containing W as its main component.

Note that the oxide is not limited to these, and may be a reduced product, a mixture, or a composite oxide of these.

According to the embodiment, the content of the oxide in the second underlayer 5 is in a range of from 2 mol % to 30 mol % and is preferably in a range of from 10 mol % to 25 mol %. If the content of the oxide in the second underlayer 5 exceeds 30 mol %, the (100) orientation of the second underlayer 5 decreases. If the content of the oxide in the second underlayer 5 is less than 2 mol %, the effect of increasing the (001) orientation of the magnetic layer 3 is not developed.

According to the embodiment, the alloy that has the $L1_0$ type crystal structure and that is included in the magnetic layer 3 has a high magnetic anisotropy constant Ku.

Examples of the alloy having the $L1_0$ type crystal structure include a FePt alloy and a CoPt alloy.

In order to promote the ordering of the alloy having the $L1_0$ type crystal structure, a heating process may be preferably performed when the magnetic layer 3 is formed. In this case, Ag, Au, Cu, and Ni, and the like may be added to the alloy having the $L1_0$ type crystal structure such that the heating temperature (ordering temperature) decreases.

Also, crystal grains of the alloy having the $L1_0$ type crystal structure included in the magnetic layer 3 are preferably magnetically isolated. Therefore, the magnetic layer 3 preferably contains one or more materials selected from a group consisting of $SiO_2$, $TiO_2$, $Cr_2O_3$, $Al_2O_3$, $Ta_2O_5$, $ZrO_2$, $Y_2O_3$, $CeO_2$, $MnO$, $TiO$, $ZnO$, $B_2O_3$, C, B, and BN. This further ensures separation of exchange couplings between crystal grains, allowing the SNR of the magnetic recording medium 100 to be further improved.

According to the embodiment, it is preferable that the second underlayer 5 has a non-granular structure. As described above, the second underlayer 5 is a layer that has a function to suppress the expansion of a heat spot in a horizontal direction. Thus, it is preferable that the second underlayer 5 does not have a structure, in which large columnar metal crystal grains are separated by a thick oxide layer such as a granular structure, but have a structure in which columnar crystal grains are partially coupled with each other via a thin oxide grain boundary.

Examples of a method using a sputtering method to deposit (make) the second underlayer 5 having a non-granular structure include a method in which oxygen is introduced to sputter gas to make reactive sputter, a method in which the amount of an oxide included in a target is decreased to reduce a particle diameter of the oxide, and a method in which an oxide that is easily reduced is used.

According to the embodiment, a barrier layer 6 is provided between the underlayer 2 and the magnetic layer 3. More specifically, the barrier layer 6 is provided between the second underlayer 5 and the magnetic layer 3.

The barrier layer 6 includes one or more compounds selected from a group consisting of MgO, TiO, NiO, TiN, TaN, HfN, NbN, ZrC, HfC, TaC, NbC, and TiC, and has a NaCl type structure.

According to the embodiment, as the magnetic layer 3, a magnetic layer including the alloy having the $L1_0$ type crystal structure with the (001) orientation is used. In order to promote the ordering of the alloy having the $L1_0$ type crystal structure, the substrate 1 may be heated when the magnetic layer 3 is formed. The barrier layer 6 is a layer that is provided to suppress the interfacial diffusion generated between the underlayer 2 and the magnetic layer 3 when the substrate 1 is heated.

The thickness of the barrier layer 6 is preferably in a range of from 0.5 nm to 10 nm. When the thickness of the barrier layer 6 is greater than or equal to 0.5 nm, the interfacial diffusion generated between the underlayer 2 and the magnetic layer 3 can be effectively suppressed when the substrate 1 is heated. Further, when the thickness of the barrier layer 6 is less than or equal to 10 nm, heat is easily conducted from the magnetic layer 3 to the second underlayer 5.

According to the embodiment, an orientation control layer 7 is provided between the substrate 1 and the first underlayer 4 of the underlayer 2. The orientation control layer 7 may be a Cr layer having a BCC structure, an alloy layer containing Cr as its main component and having a BCC structure, or an alloy layer having a B2 structure. The orientation control layer 7 has preferably the (100) orientation because the orientation control layer 7 is a layer that is provided to ensure the (100) orientation of the underlayer 2 formed on the orientation control layer 7.

In the specification and the claims, the alloy containing Cr as its main component refers to an alloy in which the content of Cr is greater than or equal to 50 at. %. Here, in the alloy containing Cr as its main component, the content of Cr is preferably greater than or equal to 70 at. % and is more preferably greater than or equal to 90 at. %.

Examples of the alloy containing Cr as its main component include, but are not limited to, a CrMn alloy, a CrMo alloy, a CrW alloy, a CrV alloy, a CrTi alloy, and a CrRu alloy.

Further, in order to improve the size and the dispersity of crystal grains of the underlayer 2, an element such as B, Si, and C may be added to the alloy containing Cr as its main component. However, in a case where such an element is added, the element is preferably added to an extent that the crystallization of the orientation control layer 7 is not deteriorated.

Moreover, examples of the alloy having a B2 structure include a RuAl alloy and a NiAl alloy.

A carbon protective layer 8 and a lubricant layer 9 made of a perfluoropolyether-based resin are provided on the magnetic layer 3.

Generally known materials can be used for the carbon protective layer 8 and the lubricant layer 9.

Note that the barrier layer 6, the orientation control layer 7, the carbon protective layer 8, and the lubricant layer 9 may be omitted as necessary.

Further, a heat sink layer may be provided in the magnetic recording medium 100 to quickly cool the magnetic layer 3.

The heat sink layer may be formed of a metal having high heat conductivity such as Ag, Cu, Al, and Au, or may be formed of an alloy containing, as its main component, a metal having high heat conductivity such as Ag, Cu, Al, and Au.

For example, the heat sink layer may be provided under the orientation control layer 7 or between the barrier layer 6 and the orientation control layer 7.

Further, a soft magnetic layer may be provided in the magnetic recording medium 100 to improve write characteristics.

Examples of the material constituting the soft magnetic layer include, but are not limited to, an amorphous alloy such as a CoTaZr alloy, a CoFeTaB alloy, a CoFeTaSi alloy, and a CoFeTaZr alloy, a microcrystalline alloy such as an FeTaC alloy and an FeTaN alloy, and a polycrystalline alloy such as a NiFe alloy.

The soft magnetic layer may be a single layer film or may have a multi-layer structure in which layers are antiferromagnetically coupled via a Ru layer of a suitable thickness.

In addition to the above described layers, other layers such as a seed layer and a bonding layer may be provided in the magnetic recording medium 100 as necessary.

(Magnetic Storage Apparatus)

A configuration example of a magnetic storage apparatus according to the embodiment will be described.

The magnetic storage apparatus according to the embodiment includes the above described magnetic recording medium according to the embodiment.

The magnetic storage apparatus may include, for example, a magnetic recording medium drive unit for rotating a magnetic recording medium, and a magnetic head that includes, at its front end portion, a near field light generation element. Further, the magnetic storage apparatus may include a laser generation unit for heating the magnetic recording medium, a waveguide that leads laser light generated at the laser generation unit to the near field light generation element, a magnetic head drive unit for moving the magnetic head, and a recording and reproducing signal processing system.

Figure 2:
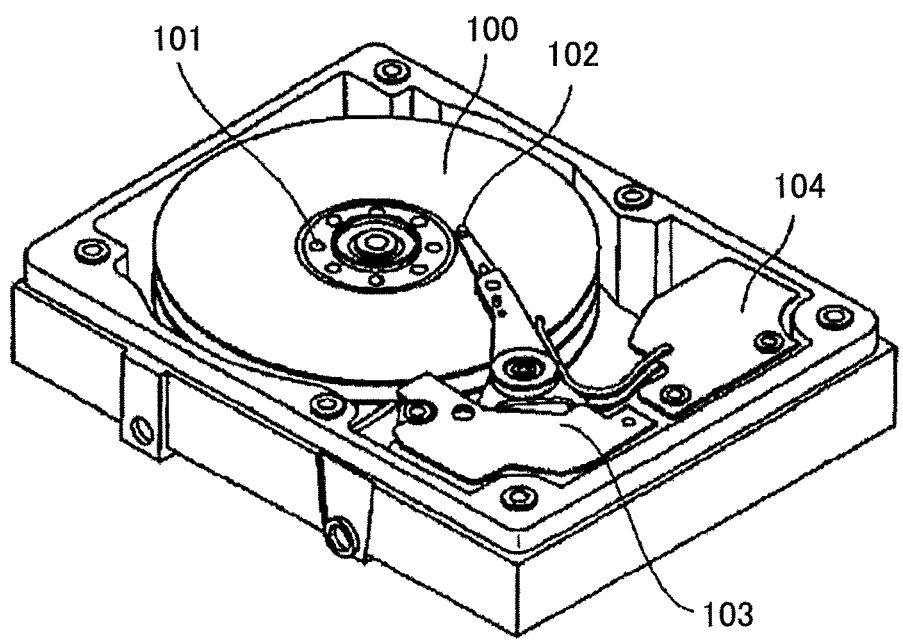
FIG. 2 is a schematic diagram illustrating an example of a magnetic storage apparatus according to the embodiment.

FIG. 2 illustrates an example of a magnetic storage apparatus according to the embodiment.

The magnetic storage apparatus illustrated in FIG. 2 includes a magnetic recording medium 100, a magnetic recording medium drive unit 101 for rotating the magnetic recording medium 100, a magnetic head 102, a magnetic head drive unit 103 for moving the magnetic head 102, a recording and reproducing signal processing system 104, and the like.

Figure 3:
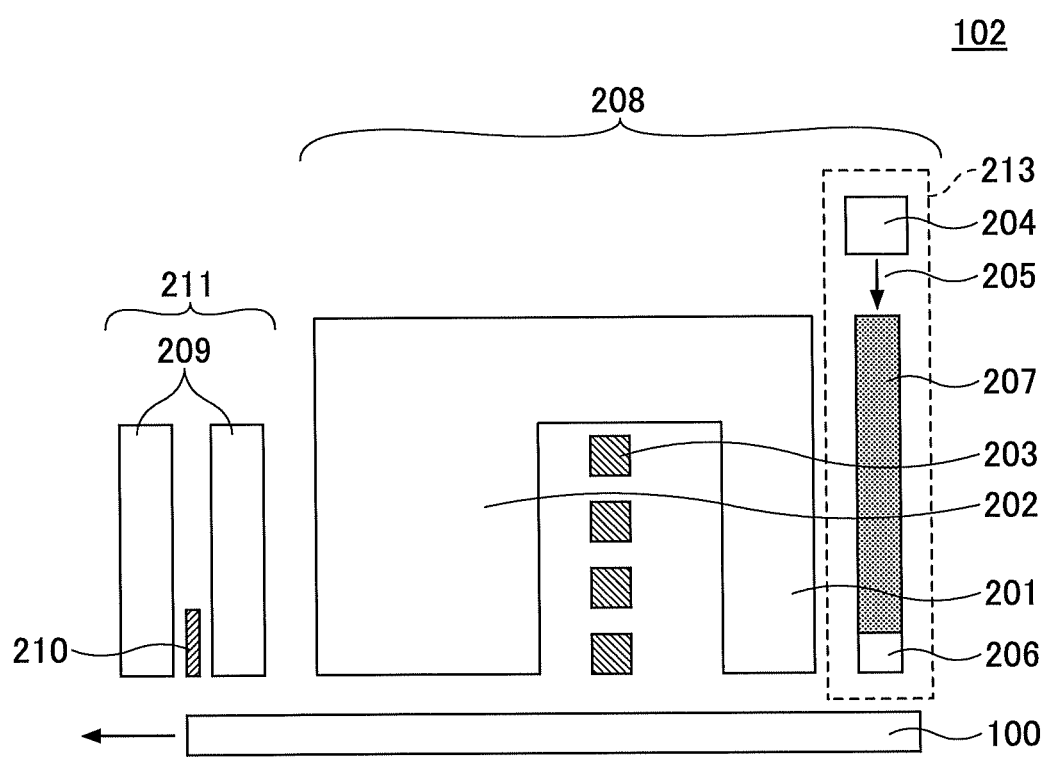
FIG. 3 is a schematic diagram illustrating an example of a magnetic head used in the magnetic storage apparatus of FIG. 2.

FIG. 3 illustrates an example of the magnetic head 102.

The magnetic head 102 includes a recording head 208 and a reproducing head 211.

The recording head 208 includes a main magnetic pole 201, an auxiliary magnetic pole 202, a coil 203 for generating a magnetic field, a laser diode (LD) 204, which serves as a laser generation unit, a waveguide 207 for transmitting laser light 205 generated at the LD 204 to a near field light generation element 206, and the like.

The reproducing head 211 includes a reproducing element 210 sandwiched by shields 209.

The magnetic storage apparatus illustrated in FIG. 2 uses the magnetic recording medium 100. Therefore, it becomes possible to enhance the SNR and to provide the magnetic storage apparatus having a high recording density.

WORKING EXAMPLES

In the following, specific working examples will be described. The present invention is not limited to the following working examples.

Working Example 1

The magnetic recording medium 100 (see FIG. 1) was produced. In the following, a process of producing the magnetic recording medium 100 will be described.

As a seed layer, a film made of Cr-50 at. % Ti (an alloy with a CR content of 50 at. % and a Ti content of 50 at. %) and having a thickness of 25 nm was formed on a glass substrate 1 having an outer diameter of 2.5 inches. Subsequently, the substrate 1 was heated at 300° C. Subsequently, as an orientation control layer 7, a film made of Cr-5 at. % Mn (an alloy with a Cr content of 95 at. % and a Mn content of 5 at. %) and having a thickness of 20 nm was formed. Next, as a first underlayer 4, a W layer having a thickness of 20 nm was formed. On the first underlayer 4, a W-3.2WO$_3$ (alloy in which the content of W is 96.8 mol % and the content of WO$_3$ is 3.2 mol %) layer having a non-granular structure and having a thickness of 20 nm was formed as a second underlayer 5. Further, as a barrier layer 6, a MgO film having a thickness of 2 nm was formed. Subsequently, the substrate 1 was heated at 580° C. As a magnetic layer 3, a film made of (Fe-45 at. % Pt)-12 mol % SiO$_2$-6 mol % BN (an alloy with an FePt alloy content of 82 mol % in which a Fe content is 55 at. % and a Pt content is 45 at. %, a SiO$_2$ content of 12 mol %, and a BN content of 6 mol %) and having a thickness of 10 nm was formed. Further, after a carbon protective layer 8 having a thickness of 3 nm was formed, a lubricant layer 9 made of a perfluoropolyether-based fluororesin is formed on the surface of the carbon protective layer 8. Accordingly, the magnetic recording medium 100 was produced.

Working Examples 2 to 4

Magnetic recording mediums were produced for the working examples 2 to 4 in a manner similar to that in the working example 1, except that the composition of the second underlayer 5 was changed to W-6.9WO$_3$, W-16.5WO$_3$, and W-25WO$_3$, respectively.

Working Examples 5 to 9

Magnetic recording mediums were produced for the working examples 5 to 9 in a manner similar to that in the working example 1, except that the composition of the second underlayer 5 was changed to W-16.5Cr$_2$O$_3$, W-16.5MoO$_2$, W-16.5Nb$_2$O$_5$, W-16.5Ta$_2$O$_5$, and W-16.5V$_2$O$_3$, respectively.

Working Example 10

A magnetic recording medium was produced for the working example 10 in a manner similar to that in the working example 3, except that the composition of the first underlayer 4 was changed to W-10Mo (alloy with a W content of 90 at. % and a Mo content of 10 at. %).

Working Examples 11 and 12

Magnetic recording mediums were produced for the working examples 11 and 12 in a manner similar to that in the working example 1, except that the composition of the second underlayer 5 was changed to W-10Mo-16.5WO$_3$ (alloy in which the content of W is 73.5 mol %, the content of Mo is 10 mol %, and the content of WO$_3$ is 16.5 mol %) and W-8WO$_2$-8WO$_3$ (alloy in which the content of W is 84 mol %, the content of WO$_2$ is 8 mol %, and the content of WO$_3$ is 8 mol %), respectively.

Comparative Example 1

A magnetic recording medium was produced for the comparative example 1 in a manner similar to that in the working example 1, except that the second underlayer 5 was not formed.

Comparative Example 2

A magnetic recording medium was produced for the comparative example 2 in a manner similar to that in the working example 1, except that the first underlayer 4 was not formed.

Comparative Examples 3 and 4

Magnetic recording mediums were produced for the comparative examples 3 to 4 in a manner similar to that in the working example 1, except that the composition of the second underlayer 5 was changed to W-1.6WO$_3$ and W-30.7WO$_3$ respectively.

Comparative Example 5

A magnetic recording medium was produced for the comparative example 5 in a manner similar to that in the working example 1, except that the composition of the second underlayer 5 was changed to W-8Si (alloy with a W content of 92 at. % and a Si content of 8 at. %).

Comparative Example 6

A magnetic recording medium was produced for the comparative example 6 in a manner similar to that in the comparative example 5, except that the first underlayer 4 was not formed.

Comparative Examples 7 to 9

Magnetic recording mediums were produced for the comparative examples 7 to 9 in a manner similar to that in the working example 1, except that the composition of the second underlayer 5 was changed to W-15TiO, W-15B$_2$O$_3$, and W-15Al$_2$O$_3$ respectively.

Next, a half width of W (100) peak, a half width of FePt (001) peak, a CTTG (Cross-Track Thermal Gradient), and a SNR were evaluated for each example.

(Half Width of W (100) Peak)

For each example, using an X-ray diffractometer (manufactured by Koninklijke Philips N.V.), the half width of W (100) peak was obtained by measuring X-ray diffraction spectra of a sample of a magnetic recording medium after the underlayer 2 was formed.

(Half Width of FePt (001) Peak)

For each example, using an X-ray diffractometer (manufactured by Koninklijke Philips N.V.), the half width of FePt (001) peak was obtained by measuring X-ray diffraction spectra of a sample of a magnetic recording medium after the magnetic layer 3 was formed.

(CTTG)

For each example, using Read Write Analyzer RWA-1632 and Spin Stand 51701MP manufactured by Guzik Technical Enterprises, the CTTG (Cross-Track Thermal Gradient) of a magnetic recording medium was measured. Here, the CTTG is a thermal gradient [K/nm] in a direction perpendicular to a tracking direction. It indicates that as the value of the CTTG becomes larger, the thermal gradient is precipitous, that is, a recording temperature difference between recording bits becomes larger, and writing bleeding decreases.

Note that CTTGs could not be measured for the magnetic recording mediums of the comparative examples 2 and 6 because recorded signal intensities were weak and writing linewidths could not be specified.

(SNR)

The SNR was measured by recording an all-one pattern signal with a linear recording density of 1500 kFCI on each magnetic recording medium by using the magnetic head 102 (see FIG. 3). Here, power supplied to the laser diode was adjusted such that a track width MWW, which was defined as the half width of a track profile, was 60 nm.

The table 1 illustrates evaluation results of the half width of W (100) peak, the half width of FePt (001) peak, the CTTG (Cross-Track Thermal Gradient), and the SNR for each example.

TABLE 1

| | FIRST UNDERLAYER | SECOND UNDERLAYER | HALF WIDTH OF W (100) PEAK [°] | HALF WIDTH OF FePt (001) PEAK [°] | CTTG [K/nm] | SNR [dB] |
|---|---|---|---|---|---|---|
| WORKING EXAMPLE 1 | W | W—3.2WO$_3$ | 1.7 | 6.5 | 4.99 | 4.8 |
| WORKING EXAMPLE 2 | W | W—6.9WO$_3$ | 1.8 | 6.5 | 5.39 | 4.7 |
| WORKING EXAMPLE 3 | W | W—16.5WO$_3$ | 1.8 | 6.5 | 5.98 | 5.3 |
| WORKING EXAMPLE 4 | W | W—25WO$_3$ | 1.8 | 6.5 | 5.86 | 5.1 |
| WORKING EXAMPLE 5 | W | W—16.5Cr$_2$O$_3$ | 1.8 | 6.6 | 5.18 | 4.5 |
| WORKING EXAMPLE 6 | W | W—16.5MoO$_2$ | 1.8 | 6.6 | 5.73 | 4.7 |
| WORKING EXAMPLE 7 | W | W—16.5Nb$_2$O$_5$ | 1.8 | 6.6 | 5.15 | 4.7 |
| WORKING EXAMPLE 8 | W | W—16.5Ta$_2$O$_5$ | 1.7 | 6.5 | 5.37 | 4.7 |
| WORKING EXAMPLE 9 | W | W—16.5V$_2$O$_3$ | 1.8 | 6.6 | 5.21 | 4.5 |
| WORKING EXAMPLE 10 | W—10Mo | W—16.5WO$_3$ | 1.8 | 6.6 | 5.88 | 5.2 |
| WORKING EXAMPLE 11 | W | W—10Mo—16.5WO$_3$ | 1.8 | 6.6 | 5.75 | 5.0 |
| WORKING EXAMPLE 12 | W | W—8WO$_2$—8WO$_3$ | 1.7 | 6.5 | 5.69 | 5.2 |
| COMPARATIVE EXAMPLE 1 | W | — | 1.6 | 6.5 | 4.58 | 4.0 |
| COMPARATIVE EXAMPLE 2 | — | W—16.5WO$_3$ | 2.2 | 7.0 | — | <2.0 |
| COMPARATIVE EXAMPLE 3 | W | W—1.6WO$_3$ | 1.6 | 6.5 | 4.86 | 4.2 |
| COMPARATIVE EXAMPLE 4 | W | W—30.7WO$_3$ | 2.0 | 6.8 | 5.77 | 3.7 |
| COMPARATIVE EXAMPLE 5 | W | W—8SiO$_2$ | 2.3 | 7.1 | 5.10 | 4.2 |
| COMPARATIVE EXAMPLE 6 | — | W—8SiO$_2$ | 2.9 | 7.7 | — | <2.0 |

TABLE 1-continued

| | FIRST UNDERLAYER | SECOND UNDERLAYER | HALF WIDTH OF W (100) PEAK [°] | HALF WIDTH OF FePt (001) PEAK [°] | CTTG [K/nm] | SNR [dB] |
|---|---|---|---|---|---|---|
| COMPARATIVE EXAMPLE 7 | W | W—15TiO | 2.2 | 6.9 | 4.72 | 4.2 |
| COMPARATIVE EXAMPLE 8 | W | W—15B$_2$O$_3$ | 2.2 | 7.0 | 4.91 | 4.1 |
| COMPARATIVE EXAMPLE 9 | W | W—15Al$_2$O$_3$ | 2.4 | 7.2 | 4.57 | 4.1 |

As seen from the table 1, the magnetic recording mediums of the working examples 1 to 12 had higher CTTGs and higher SNRs than those of the magnetic recording mediums of the comparative examples 1 to 3 and 6 to 9. Further, the magnetic recording mediums of the working examples 1 to 4 and 10 to 12 had particularly high CTTGs and SNRs because of including the second underlayer 5 containing an oxide of W.

As a grain boundary of oxide increases, heat becomes difficult to spread. Therefore, depending on an amount or a type of an oxide, the CTTG may become high as in the magnetic recording mediums of the comparative examples 4 and 5. However, the SNR includes factors such as the orientation of the underlayer 2 and the magnetic layer 3 other than the CTTG. Hence, in the magnetic recording mediums of the comparative examples 4 and 5, the orientation of the underlayer and the magnetic layer was degraded and the SNR was low.

Further, the present disclosure is not limited to these embodiments, but various variations and modifications may be made without departing from the scope of the present invention.

What is claimed is:

1. A magnetic recording medium comprising:
    a substrate;
    a first underlayer;
    a second underlayer; and
    a magnetic layer including an alloy having a L1$_0$ type crystal structure with a (001) orientation,
    wherein the substrate, the first underlayer the second underlayer, and the magnetic layer are stacked in this order,
    wherein the first underlayer is a crystalline layer that includes W as a main component,
    wherein the second underlayer is a crystalline layer that includes a material containing W as a main component and that includes an oxide, a content of the oxide in the second underlayer being in a range of from 2 mol % to 30 mol %, and
    wherein the oxide is an oxide of W.

2. The magnetic recording medium according to claim 1, further comprising:
    a barrier layer between the second underlayer and the magnetic layer,
    wherein the barrier layer includes one or more compounds selected from a group consisting of MgO, TiO, NiO, TiN, TaN, HfN, NbN, ZrC, HfC, TaC, NbC, and TiC, and has a NaCl type structure.

3. The magnetic recording medium according to claim 1, further comprising:
    an orientation control layer between the substrate and the first underlayer,
    wherein the orientation control layer is a Cr layer having a BCC structure, an alloy layer containing Cr as a main component and having a BCC structure, or an alloy layer having a B2 structure.

4. A magnetic storage apparatus comprising the magnetic recording medium according to claim 1.

5. A magnetic recording medium comprising:
    a substrate;
    a first underlayer;
    a second underlayer; and
    a magnetic layer including an alloy having a L1$_0$ type crystal structure with a (001) orientation,
    wherein the substrate, the first underlayer the second underlayer, and the magnetic layer are stacked in this order,
    wherein the first underlayer is a crystalline layer that includes W as a main component,
    wherein the second underlayer is a crystalline layer that includes a material containing W as a main component and that includes an oxide of W, a content of the oxide in the second underlayer being in a range of from 2 mol % to 30 mol %.

* * * * *